United States Patent [19]

Tanaka et al.

[11] Patent Number: 5,766,563
[45] Date of Patent: Jun. 16, 1998

[54] METHOD FOR CONTROLLING THE OXIDATION OF SULFITES IN A FLUE GAS DESULFURIZATION PROCESS

[75] Inventors: Hiroshi Tanaka; Susumu Okino; Koosoo Tao, all of Hiroshima-ken, Japan

[73] Assignee: Mitsubishi Jukogyo Kabushiki Kaisha, Tokyo, Japan

[21] Appl. No.: 767,639

[22] Filed: Dec. 17, 1996

[30] Foreign Application Priority Data

Dec. 19, 1995 [JP] Japan ................ 7-330452

[51] Int. Cl.$^6$ .............. B01D 53/50; G05D 7/00
[52] U.S. Cl. .............. 423/242.1; 423/243; 423/DIG. 5; 422/110; 204/402; 205/786.5
[58] Field of Search .............. 423/242.1, 243.08, 423/DIG. 5; 422/110; 204/402; 205/786.5

[56] References Cited

U.S. PATENT DOCUMENTS

| | | | |
|---|---|---|---|
| 4,533,440 | 8/1985 | Kim | 204/1 |
| 5,266,286 | 11/1993 | Ukawa et al. | 423/243.08 |
| 5,304,308 | 4/1994 | Tsumura et al. | 210/614 |
| 5,560,893 | 10/1996 | Okino et al. | 423/242.1 |

FOREIGN PATENT DOCUMENTS

| | | |
|---|---|---|
| 0 224 627 A1 | 6/1987 | European Pat. Off. |
| 301 548 A7 | 11/1993 | Germany |
| 62-65927 A | 3/1987 | Japan |
| 3-137918 A | 6/1991 | Japan |
| 158569/94 | 7/1994 | Japan |
| 6-238126 A | 8/1994 | Japan |

OTHER PUBLICATIONS

Patent Abstracts of Japan, Pub. No. JP 7-204459, vol. 95, No. 11, Ab. date Dec. 1995.
Patent Abstracts of Japan, Pub. No. JP 62-54344, vol. 18, No. 651, Ab. date Dec. 1994.

*Primary Examiner*—Gary P. Straub
*Assistant Examiner*—Timothy C. Vandy
*Attorney, Agent, or Firm*—Foley & Lardner

[57] ABSTRACT

A method of controlling the oxidation of sulfites in a flue gas desulfurization process involves treating the exhaust gas with an absorbing fluid containing a calcium compound and controlling the oxidation of sulfites by regulating oxygen flow into the absorbing fluid. Oxygen flow is controlled by continuously monitoring the oxidation-reduction potential (ORP) of the absorbing fluid relative to the same fluid in a completely oxidized state using a detector with a plurality of fluid tanks, one of which functions as a reference tank at any particular time. The fully oxidized reference tank is periodically switched, reducing adherence of oxidizing substances to the ORP electrodes, resulting in more accurate measurements and reduced chemical oxygen demand of the waste water.

5 Claims, 3 Drawing Sheets

METHOD FOR CONTROLLING THE OXIDATION OF SULFITES IN A FLUE GAS DESULFURIZATION PROCESS

BACKGROUND OF THE INVENTION

1. Field of the Invention

This invention relates to a method for controlling the oxidation of sulfites in a flue gas desulfurization process wherein the oxidation of calcium sulfite in the absorbing fluid can be achieved efficiently.

2. Description of the Related Art

When sulfur oxide-containing exhaust gas is subjected to flue gas desulfurization according to the wet lime-gypsum method, sulfur dioxide which is a typical sulfur oxide present in the exhaust gas is brought into contact with an absorbing fluid containing calcium carbonate and absorbed according to the following reaction.

$$SO_2 + CaCO_3 \rightarrow CaSO_3$$

A portion of the calcium sulfite so produced is oxidized by oxygen present in the exhaust gas to form gypsum.

$$CaSO_3 + \tfrac{1}{2}O_2 \rightarrow CaSO_4$$

Usually, the oxygen concentration in the exhaust gas is so low that the oxidation of calcium sulfite to gypsum is not sufficiently effected. Consequently, an oxygen-containing gas is supplied from the outside of the system and passed through the absorbing fluid.

However, if the flow rate of the oxygen-containing gas is low, the concentration of unoxidized calcium sulfite will increase. This may cause several difficulties including an inhibition of the dissolution of calcium carbonate used as absorbent, a reduction in desulfurization performance, and an increase in the chemical oxygen demand (hereinafter referred to as "COD") of waste water from the desulfurizer.

On the other hand, if an attempt is made to maintain a high degree of conversion of calcium sulfite to gypsum, it is inevitable to supply the oxygen-containing gas in excess with consideration for load fluctuations and the like. This leads to an increase in running cost and a rise in the COD of waste water.

Accordingly, it is necessary to control the flow rate of the oxygen-containing gas so as to remain in a proper range.

In order to control the flow rate of the oxygen-containing gas involved in the oxidation of calcium sulfite, a method based on the use of oxidation-reduction potential (hereinafter referred to as "ORP") is known. In the conventional method for controlling the flow rate in response to ORP, a preset ORP value is determined in advance on the basis of the preestablished relationship between ORP and sulfurous acid concentration, and the flow rate is controlled in response to a deviation signal between a signal obtained by detecting the ORP of the absorbing fluid continuously and the preset ORP value.

However, ORP is affected not only by sulfurous acid concentration, but also by pH and dissolved solution components. Consequently, the conventional method has the disadvantage that stable oxidation control cannot be achieved because of variation in pH and changes of dissolved solution components, which result from load fluctuations, changes of the absorbent material, and/or changes of the type of fuel, as well as erroneous indications of the pH meter. This may cause such difficulties as an increase in the COD of waste water due to an increase in sulfurous acid concentration or an oversupply of air.

In order to overcome these disadvantages, the present inventors have developed a method for an oxidation controlling which comprises continuously detecting a first deviation signal between the ORP of the absorbing fluid and the ORP of the absorbing fluid in a completely oxidized state by means of an ORP detector equipped with a sample fluid tank for detecting the ORP of the absorbing fluid and a reference fluid tank for oxidizing the absorbing fluid by the passage of air therethrough and detecting the ORP of the absorbing fluid in a completely oxidized state, and controlling the flow rate of the oxygen-containing gas in response to a second deviation signal between the first deviation signal and a preset ORP deviation value (see Japanese Patent Application No. 158569/'94).

One embodiment of an ORP detector for use in this method is illustrated in FIG. 3, and the method for measuring ORP is described below with reference to this figure. From an absorption tower where combustion exhaust gas is brought into contact with an absorbing fluid containing a calcium compound, a portion of the absorbing fluid 3 is introduced into an ORP measuring tank 17. The ORP measuring tank 17 is partitioned into a sample fluid tank 18 and a reference fluid tank 19. In the reference fluid tank 19, the absorbing fluid is completely oxidized by supplying air 20 from the outside of the system. In these tanks, the ORP of the absorbing fluid and the ORP of the absorbing fluid in a completely oxidized state are detected by ORP electrodes 21 and 22, respectively. The detected signals are fed to an arithmetic unit 23 where the deviation between the ORP of the absorbing fluid and the ORP of the absorbing fluid in a completely oxidized state is calculated. The resulting deviation signal 24 is set from the arithmetic unit 23. After ORP measurements are made, the return absorbing fluid 25 from sample fluid tank and the return absorbing fluid 26 from reference fluid tank are returned again to the fluid reservoir of the absorption tower.

In this method, the ORP of the absorbing fluid is continuously detected in one (i.e., the sample fluid tank) of the two tanks into which the ORP measuring tank is partitioned. In the other tank (i.e., the reference fluid tank), the ORP of the absorbing fluid in a completely oxidized state is continuously detected by constantly passing air through the absorbing fluid placed therein. Thus, since air is constantly passed only through the reference fluid tank, oxidizing substances adhere to the surface of the ORP electrode of the reference fluid tank. The resulting erroneous indications of the ORP electrode may interfere with the maintenance of stable oxidation control and cause such difficulties as an increase in the COD of waste water due to an oversupply of air.

SUMMARY OF THE INVENTION

In view of the above-described technical level, an object of the present invention is to provide a method for controlling the oxidation of sulfites which, when employed in a flue gas desulfurization process for treating sulfur oxide-containing exhaust gas according to the wet lime-gypsum method, can overcome the disadvantages of the conventional methods.

As described above, in a flue gas desulfurization process for treating sulfur oxide-containing exhaust gas according to the wet lime-gypsum method, the flow rate of the oxygen-containing gas passed through the absorbing fluid has conventionally been controlled by continuously detecting a first deviation signal between the ORP of the absorbing fluid and the ORP of the absorbing fluid in a completely oxidized state by means of an ORP detector equipped with a sample fluid tank for detecting the ORP of the absorbing fluid and a reference fluid tank for oxidizing the absorbing fluid by the passage of air therethrough and detecting the ORP of the absorbing fluid in a completely oxidized state, and controlling the flow rate of the oxygen-containing gas in response to a second deviation signal between the first deviation signal and a preset ORP deviation value. However, when the ORP of the absorbing fluid in a completely oxidized state is continuously measured in only one measuring tank, oxidizing substances adhere to the ORP electrode of this measuring tank. Accordingly, the present inventors made intensive investigations on the above-described flue gas desulfurization process based on the lime-gypsum method with a view to preventing the adhesion of such oxidizing substances and removing them, and have now discovered that this problem can be solved by switching the passage of air successively to other tanks. The present invention has been completed on the basis of this discovery.

Thus, the present invention provides, for use in a flue gas desulfurization process wherein sulfur oxide-containing exhaust gas is treated with an absorbing fluid containing a calcium compound, and an oxygen-containing gas is passed through the absorbing fluid containing the resulting calcium sulfite to oxidize the calcium sulfite and thereby form gypsum, a method for controlling the oxidation of sulfites which comprises the steps of continuously detecting a first deviation signal between the oxidation-reduction potential of the absorbing fluid and the oxidation-reduction potential of the absorbing fluid in a completely oxidized state by means of an oxidation-reduction potential detector equipped with a sample fluid tank for detecting the oxidation-reduction potential of the absorbing fluid and a reference fluid tank for oxidizing the absorbing fluid by the passage of air therethrough and detecting the oxidation-reduction potential of the absorbing fluid in a completely oxidized state, and controlling the flow rate of the oxygen-containing gas in response to a second deviation signal between the first deviation signal and a preset oxidation-reduction potential deviation value, wherein the oxidation-reduction potential of the absorbing fluid and the oxidation-reduction potential of the absorbing fluid in a completely oxidized state are continuously detected by using an oxidation-reduction potential detector equipped with a plurality of reference fluid tanks, passing air through one of the reference fluid tanks to detect therein the oxidation-reduction potential of the absorbing fluid in a completely oxidized state, and, successively switching the passage of air to other reference fluid tanks at predetermined intervals of time to detect therein the oxidation-reduction potential of the absorbing fluid in a completely oxidized state.

The present invention provides a purposive method for controlling the oxidation of sulfites present in the absorbing fluid used in a flue gas desulfurization process, thus making it possible to reduce the COD of waste water.

According to the present invention while the number of reference fluid tanks should be more than one, there is no intrinsic upper limit of this number. In the embodiment which will be discussed below, the number is three.

DETAILED DESCRIPTION OF THE PREFERRED EMBODIMENTS

The present invention has been completed as a result of intensive investigations made with a view to maintaining oxidation control stably in response to ORP, and is based on the discovery that, when the ORP of the absorbing fluid in a completely oxidized state is measured in only one of two tanks into which an ORP measuring tank is partitioned, oxidizing substances adhere to the surface of the ORP electrode of that tank and, therefore, the maintenance of stable oxidation control is interfered with. In the method of the present invention, the oxidation-reduction potential of the absorbing fluid in a completely oxidized state is detected by using an oxidation-reduction potential detector equipped with a plurality of reference fluid tanks, passing air through one of the reference fluid tanks to detect therein the oxidation-reduction potential of the absorbing fluid in a completely oxidized state, and successively switching the passage of air to other reference fluid tanks at predetermined intervals of time to detect therein the oxidation-reduction potential of the absorbing fluid in a completely oxidized state. Thus, the accumulation of oxidizing substances on the ORP electrodes can be prevented and, therefore, the oxidation-reduction potential of the absorbing fluid and the oxidation-reduction potential of the absorbing fluid in a completely oxidized state can be detected continuously. This makes it possible to maintain stable oxidation control for a long period of time and thereby reduce the COD of waste water.

Figure 2:
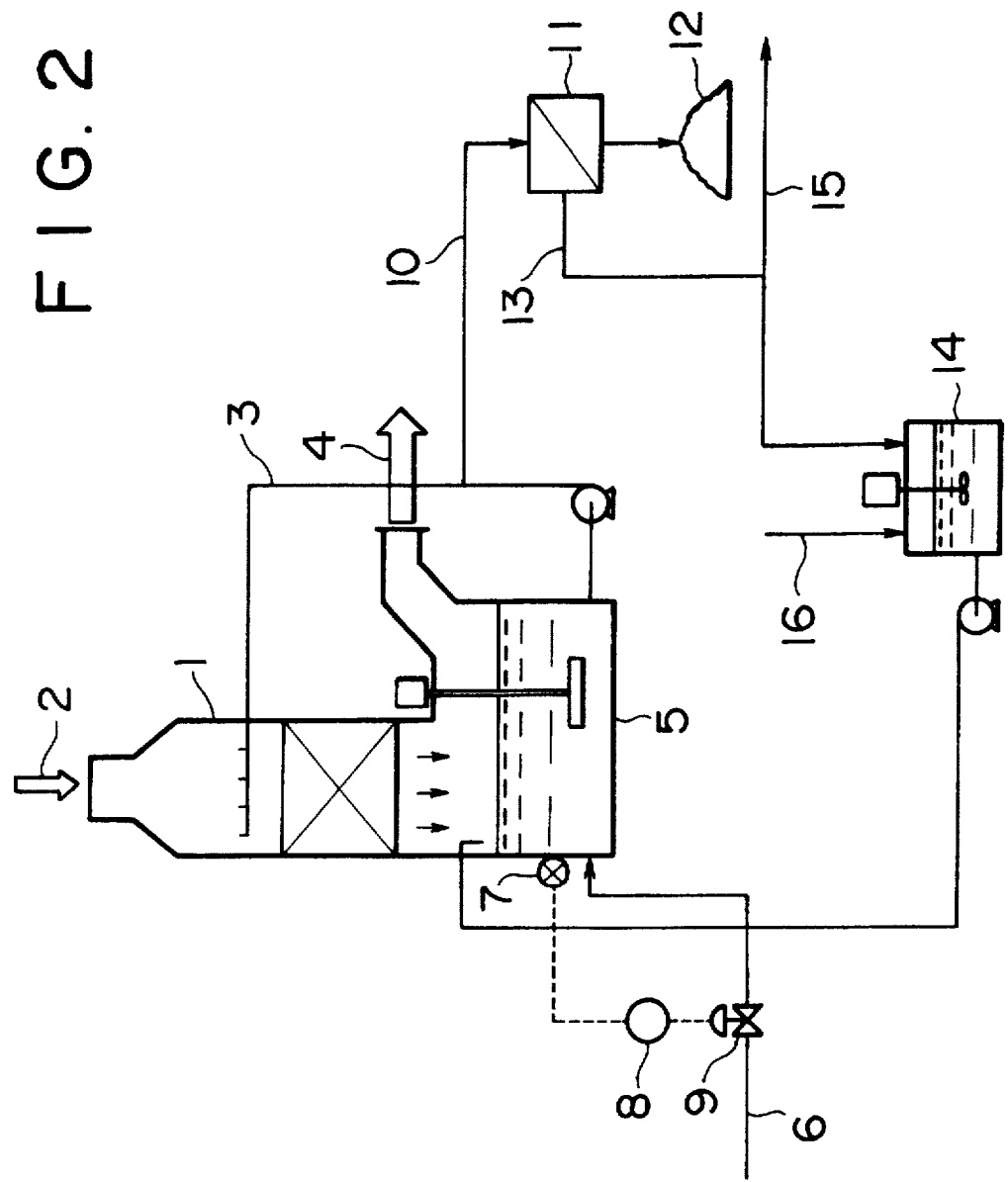
FIG. 2 is a schematic view illustrating an exemplary flue gas desulfurization process to which the method of the present invention is applied.
Figure 3:
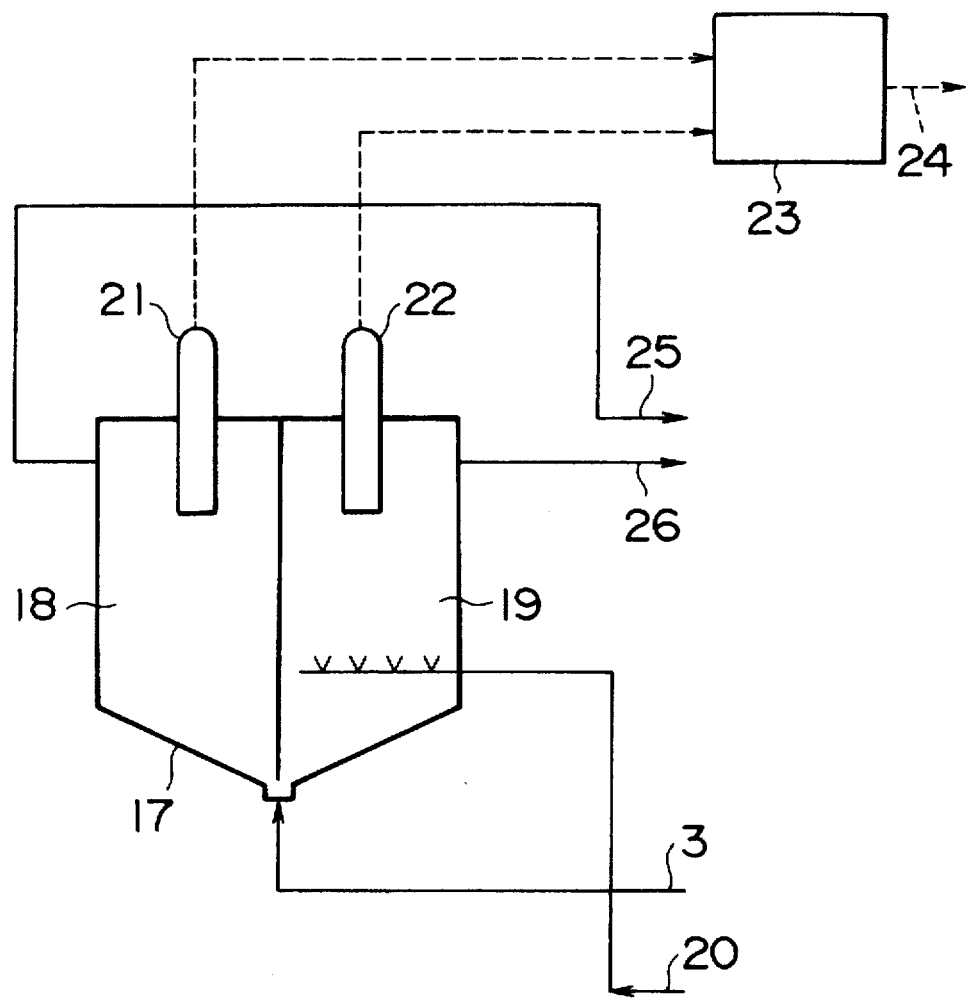
FIG. 3 is a schematic view illustrating the construction of an ORP detector partitioned into a sample fluid tank and a reference fluid tank.

One embodiment of the present invention is described hereinbelow with reference to FIG. 2. FIG. 2 is a schematic view illustrating an exemplary flue gas desulfurization process to which the method of the present invention is applied. In the process of FIG. 2, combustion exhaust gas 2 introduced into an absorption tower 1 is brought into gas-liquid contact with an absorbing fluid 3 circulating through the absorption tower, so that sulfur oxides present in the combustion exhaust gas are absorbed and separated. The combustion exhaust gas from which sulfur oxides have been removed is discharged as a clean gas 4. The sulfur dioxide absorbed into the absorbing fluid 3 is converted to calcium sulfite, part of which is oxidized by oxygen present in combustion exhaust gas to form gypsum. Unoxidized calcium sulfite present in the absorbing fluid is oxidized by air (or an oxygen-containing gas) 6 passed through a fluid reservoir 5 of the absorption tower to form gypsum.

Since the gypsum so formed has low solubility, it precipitates from the absorbing fluid in the form of a solid. Part of the absorbing fluid containing gypsum is discharged from the absorption tower 1 by way of a withdrawal line 10, and separated into gypsum 12 and filtrate 13 by means of a solid-liquid separator 11. Part of the filtrate 13 is fed to a raw material adjusting tank 14, and the remainder is discharged from the system as waste water 15. In the raw material adjusting tank 14, the filtrate is replenished with calcium carbonate 16 and returned again to the absorption tower 1.

The above-described oxidation is controlled by the following method. A first deviation signal between the ORP of the absorbing fluid and the ORP of the absorbing fluid in a completely oxidized state, which are detected by an ORP detector 7, is fed to a flow rate controller 8. This flow rate controller 8 produces a control valve opening/closing signal in response to a second deviation signal between the first deviation signal and a preset ORP deviation value determined in advance on the basis of the relationship between known sulfurous acid concentrations and ORP values (i.e., the deviation the ORP of the absorbing fluid and the ORP of the absorbing fluid in a completely oxidized state at a preset sulfurous acid concentration). The flow rate of air used as an oxygen-containing gas is regulated by controlling a control valve 9 in response to this opening/closing signal.

Figure 1:
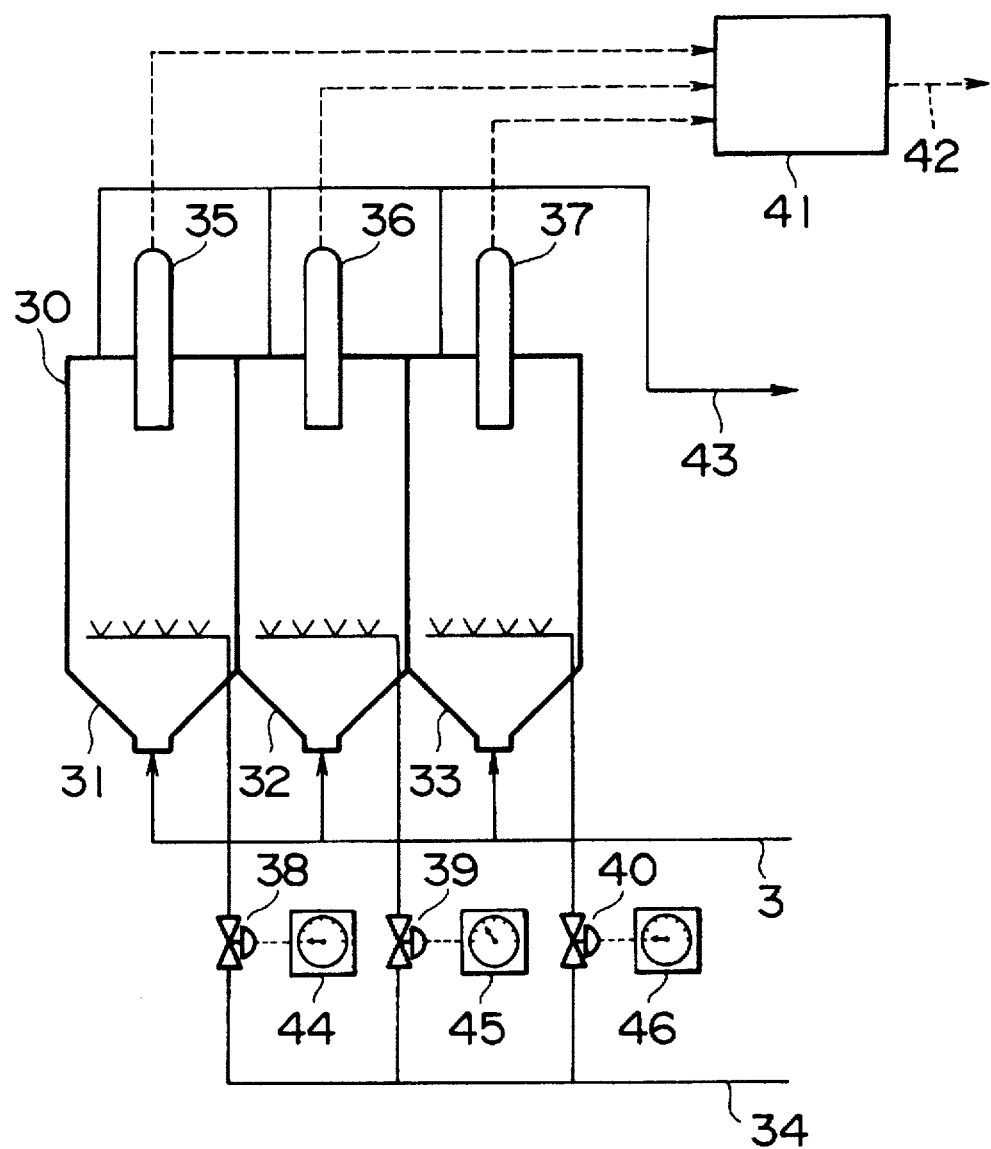
FIG. 1 is a schematic view illustrating the construction of an exemplary ORP detector which can be used in the present invention.

Now, the method for measuring the ORP of the absorbing fluid and the ORP of the absorbing fluid in a completely oxidized state is explained with reference to FIG. 1 illustrating the construction of an exemplary ORP detector which can be used in the present invention. A portion of the absorbing fluid 3 is introduced into an ORP measuring tank 30. In this embodiment, the ORP measuring tank 30 is partitioned into three tanks including tank A 31, tank B 32 and tank C 33. Tank A 31 is a sample fluid tank for measuring the ORP of the absorbing fluid, while tank B 32 and tank C 33 are reference fluid tanks for oxidizing the absorbing fluid by the supply of air 34 from the outside of the system and measuring the ORP of the absorbing fluid in a completely oxidized state.

First of all, measurements are made in tank A 31 and tank B 32. Specifically, a valve 39 is opened to pass air through tank B 32, and the ORP of the absorbing fluid and the ORP of the absorbing fluid in a completely oxidized state are measured with ORP electrodes 35 and 36, respectively. After the lapse of a certain period of time, a valve 40 for supplying air to tank C 33 is also opened to pass air through tank C 33. As soon as the ORP detected in tank C 33 has become equal to that detected in tank B 32, the valve 39 of tank B 32 is closed to stop the passage of air through tank B 32. In this phase, signals representing the ORPs detected by the ORP electrodes 35 and 37 are fed to an arithmetic unit 41 where the deviation therebetween is calculated and delivered as a deviation signal 42 between the ORP of the absorbing fluid and the ORP of the absorbing fluid in a completely oxidized state. This deviation signal 42 is sent to the flow rate controller 8 (FIG. 2), by which the control valve 9 is operated to control the flow rate of air 6 used as an oxygen-containing gas.

In this step, the ORP electrode 36 of tank B 32 is immersed in the absorbing fluid containing sulfites which are reducing substances, so that the adhesion of oxidizing substances to the surface of the electrode can be prevented. Moreover, even if some oxidizing substances adhere thereto in the oxidation step, they can be removed in this step. Furthermore, after the lapse of a certain period of time, the valve 39 of tank B 32 is opened to restart the passage of air through tank B 32. As soon as the ORP detected in tank B 32 has become equal to that detected in tank C 33, the valve 40 of tank C 33 is closed to stop the passage of air through tank C 33. In this phase, signals representing the ORPs detected by the ORP electrodes 35 and 36 are fed to the arithmetic unit 41 where the deviation therebetween is calculated and delivered as the deviation signal 42 between the ORP of the absorbing fluid and the ORP of the absorbing fluid in a completely oxidized state.

Thus, the ORP of the absorbing fluid is continuously measured in tank A 31, while the ORP of the absorbing fluid in a completely oxidized state is continuously measured in tank B 32 or tank C 33 by successively switching the passage of air through tank B 32 and tank C 33. Alternatively, the tank for measuring the ORP of the absorbing fluid (i.e., the sample fluid tank) may not be fixed but successively changed together with the tank for measuring the ORP of the absorbing fluid in a completely oxidized state (i.e., the reference fluid tank). Moreover, the passage of air may be automatically switched with the aid of timers 44, 45 and 46 by presetting the switching times according to the properties of exhaust gas, the operating conditions of the absorption tower, and the like.

The absorbing fluid 43 withdrawn from the ORP measuring tank 30 is returned again to the fluid reservoir 5 of the absorption tower.

Calculations of the above-described deviations are made according to the following formulas. (Deviation between the ORP of the absorbing fluid and the ORP of the absorbing fluid in a completely oxidized state)=(ORP of the absorbing fluid in a completely oxidized state)—(ORP of the absorbing fluid) (Preset ORP deviation value)=(ORP of the absorbing fluid in a completely oxidized state as determined from the relationship between known sulfurous acid concentrations and ORP values)—(ORP of the absorbing fluid at a preset sulfurous acid concentration as determined from the relationship between known sulfurous acid concentrations and ORP values) [Deviation between (deviation between the ORP of the absorbing fluid and the ORP of the absorbing fluid in a completely oxidized state) and (preset ORP deviation value)]=(Deviation between the ORP of the absorbing fluid and the ORP of the absorbing fluid in a completely oxidized state)—(Preset ORP deviation value)

Now, the oxidation controlling method using the above-defined deviation calculating formulas is described below. If the deviation between the ORP of the absorbing fluid and the ORP of the absorbing fluid in a completely oxidized state is greater than the preset ORP deviation value, the opening of the control valve 9 is increased to cause an increase in the flow rate of air 6. When the ORP of the absorbing fluid rises as a result of the increase in the flow rate of air 6 and the deviation between the ORP of the absorbing fluid and the ORP of the absorbing fluid in a completely oxidized state becomes less than the preset ORP deviation value, the flow rate of air 6 is decreased. Thus, oxidation is controlled by using, as an index thereto, the deviation between the ORP of the absorbing fluid and the ORP of the absorbing fluid in a completely oxidized state.

(Example)

In order to further illustrate the present invention, an example is given. The operating conditions employed in this example are shown in Table 1 below. This example illustrates a test carried out in such a state that the absorbing fluid had a relatively high manganese concentration (about 50 mg/liter) and hence tended to produce oxidizing substances.

TABLE 1

| | |
|---|---|
| Properties of exhaust gas | Inlet gas flow rate: 200 m$^3$N/h (dry) |
| | Inlet SO$_2$ concentration: 1,000 ppm (dry) |
| Absorption tower | Circulation rate of absorbing fluid: 3.9 m$^3$/h |
| | Capacity of fluid reservoir of absorption tower: 0.2 m$^3$ |
| | Preset ORP deviation value: 300 mV |
| ORP detector | Air passage switching interval: 30 minutes |

When the above-described system and operating conditions were employed, no oxidizing substance adhered to the surfaces of the ORP electrodes and, therefore, stable oxidation control could be maintained. The COD of waste water was 7 mg/liter.

(Comparative Example)

Instead of using the above-described ORP detector, an 10 ORP detector partitioned into two tanks was used. Although the system and other operating conditions were the same as those employed in the example, the COD of waste water (i.e., 43 mg/liter) was significantly higher than that observed in the example, because of erroneous indications of the ORP meter due to the adhesion of oxidizing substances to the surface of the ORP electrode.

We claim:

1. A method for controlling the oxidation of sulfites in a flue gas desulfurization process wherein sulfur oxide-containing exhaust gas is treated with an absorbing fluid containing a calcium compound and an oxygen-containing gas is passed through the absorbing fluid to oxidize the resulting calcium sulfite, thereby forming gypsum, said method comprising continuously detecting a first deviation signal between the oxidation-reduction potential of the absorbing fluid and the oxidation-reduction potential of the absorbing fluid in a completely oxidized state by means of an oxidation-reduction potential detector, and controlling the flow rate of the oxygen-containing gas in response to a second deviation signal between the first deviation signal and a preset value; wherein the first deviation signal is continuously detected using oxidation-reduction potential electrodes in a detector equipped with a plurality of fluid tanks, one of which functions as a reference tank at a select time, wherein the oxidation-reduction potential of the absorbing fluid in a completely oxidized state is detected in said reference tank through which air is passed, and wherein the reference tank is changed by successively switching the passage of air to another fluid tank at predetermined intervals of time.

2. A method for controlling the oxidation of sulfites according to claim 1, wherein the oxidation-reduction potential detector is equipped with three fluid tanks.

3. The method of claim 1 wherein the changing the identity of the reference tank is timed such that the adhesion of oxidizing substances to the oxidation-reduction potential electrodes is substantially reduced or prevented.

4. The method of claim 1 wherein the changing the identity of the reference tank is performed automatically with the aid of timers.

5. The method of claim 1 wherein the predetermined time for changing the reference tank is related to the chemical oxygen demand of the waste water.

* * * * *